Figure 4:
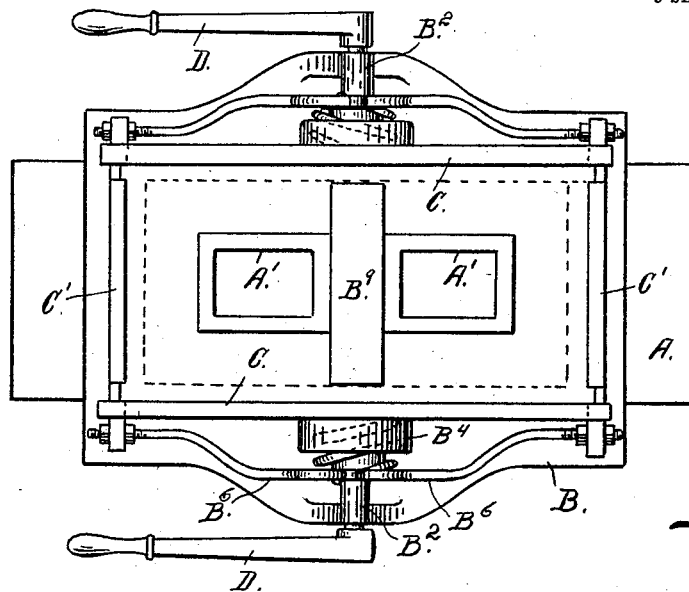

No. 768,904. PATENTED AUG. 30, 1904.
T. A. McMURTRIE.
MOLD FOR CONCRETE BLOCKS.
APPLICATION FILED FEB. 27, 1904.
NO MODEL. 3 SHEETS—SHEET 1.
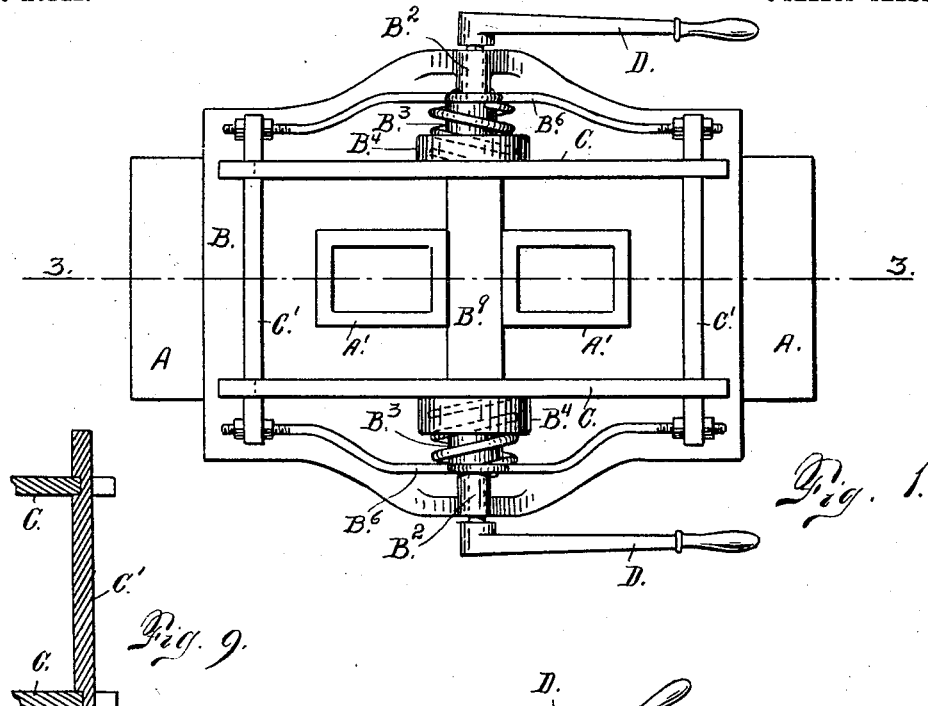
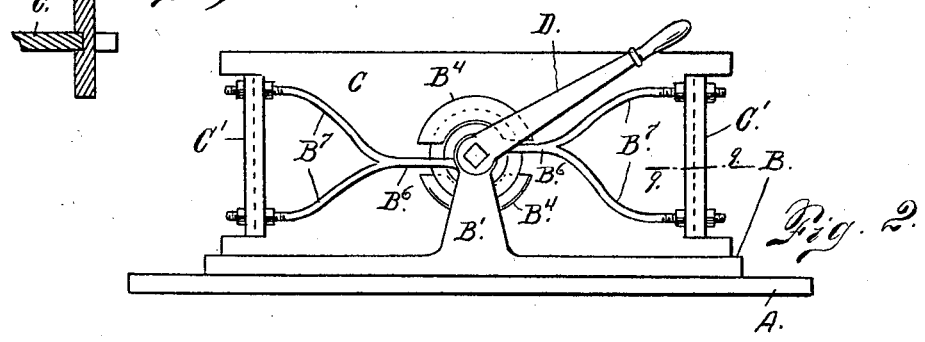
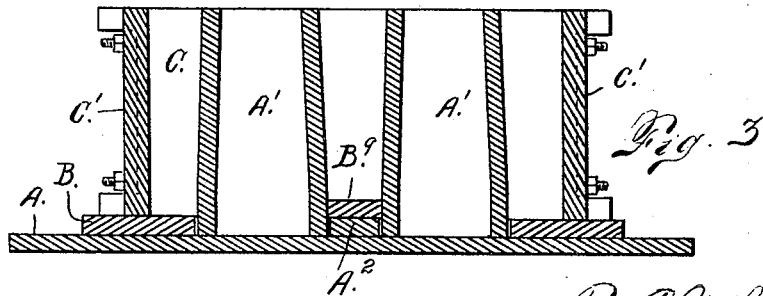

No. 768,904. PATENTED AUG. 30, 1904.
T. A. McMURTRIE.
MOLD FOR CONCRETE BLOCKS.
APPLICATION FILED FEB. 27, 1904.
NO MODEL. 3 SHEETS—SHEET 2.

Witnesses
Otto E. Hoddick
Dena Nelson

T. A. McMurtrie
Inventor

Attorney

No. 768,904. PATENTED AUG. 30, 1904.
T. A. McMURTRIE.
MOLD FOR CONCRETE BLOCKS.
APPLICATION FILED FEB. 27, 1904.
NO MODEL. 3 SHEETS—SHEET 3.

T. A. McMurtrie
Inventor

Witnesses
Otto E. Hoddick.
Dena Nelson,

Attorney

No. 768,904.     Patented August 30, 1904.

UNITED STATES PATENT OFFICE.

THOMAS A. McMURTRIE, OF DENVER, COLORADO.

MOLD FOR CONCRETE BLOCKS.

SPECIFICATION forming part of Letters Patent No. 768,904, dated August 30, 1904.

Application filed February 27, 1904. Serial No. 195,653. (No model.)

*To all whom it may concern:*

Be it known that I, THOMAS A. McMURTRIE, a citizen of the United States of America, residing in the city and county of Denver and State of Colorado, have invented certain new and useful Improvements in Molds for Concrete Blocks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in molds adapted for use in making bricks or blocks of mortar, concrete, cement, or other material.

The distinguishing feature of my invention is the means whereby the walls of the block are moved away from the latter after the block has been molded and it becomes necessary to remove it from the mold.

By means of my improved construction I am enabled by a single movement of hand-levers to move simultaneously both sides and both ends of the mold away from the molded block and by a reverse movement to return the sides and ends of the mold to their normal position, whereby they are adapted to receive the mortar, cement, or concrete, as the case may be.

As shown in the drawings, the bottom of the mold is provided with an opening to receive one or more upwardly-projecting cores whereby a hollow block is formed in the mold.

Having briefly outlined my improved construction, as well as the function it is intended to perform, I will proceed to describe the same in detail, reference being made to the accompanying drawings, in which is illustrated an embodiment thereof.

Figure 7:
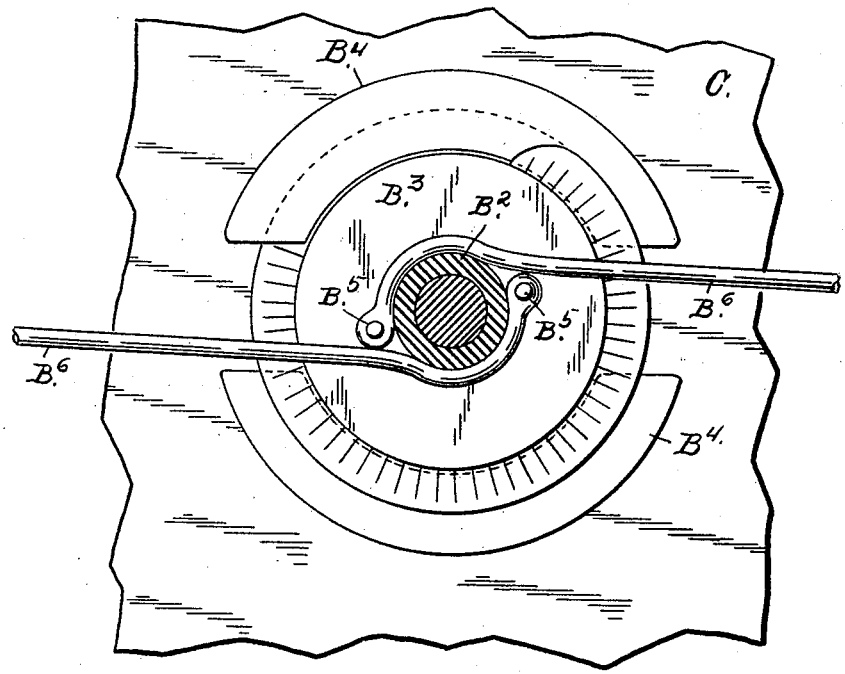
Figure 8:
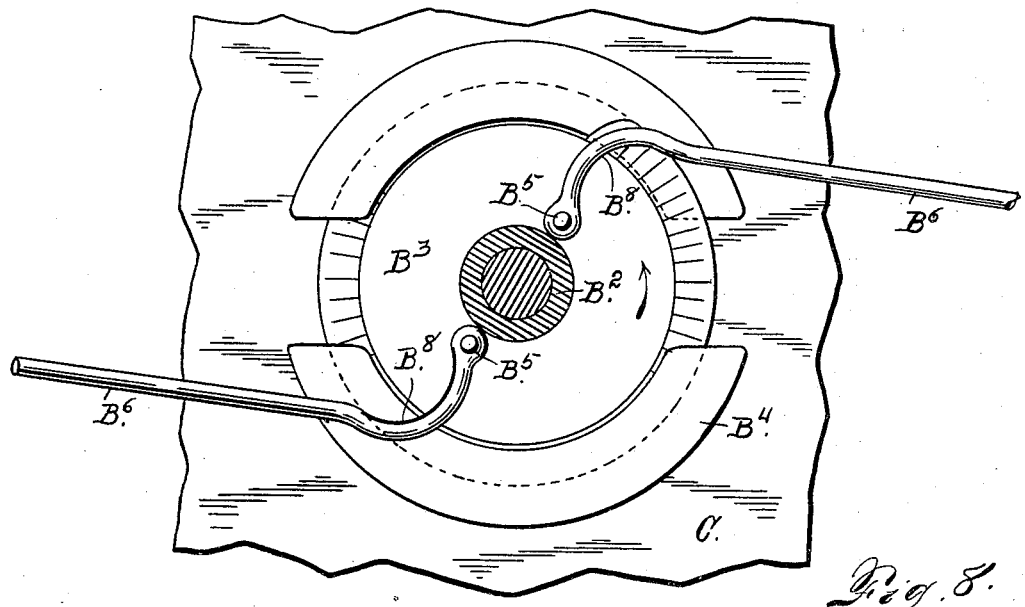
Figure 5:
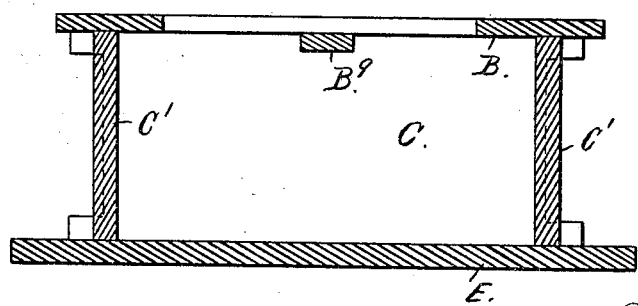
Figure 6:
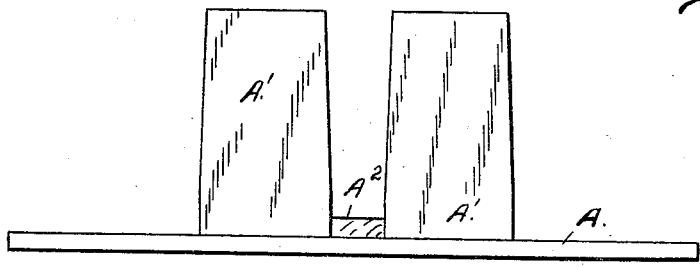

In the drawings, Figure 1 is a top or plan view of my improved mold, the parts being shown in the closed position. Fig. 2 is a side elevation of the same. Fig. 3 is a section taken on the line 3 3, Fig. 1. Fig. 4 is a top view of the mold with the parts shown in the open position or in a position to release the block. Fig. 5 is an inverted sectional view of the body of the mold with its top resting upon a board or plate adapted to form a support for the concrete block when it is removed from the mold. Fig. 6 is a detail view of the base board or plate with which the core-pieces are connected. Fig. 7 is an enlarged fragmentary side view of the mold, illustrating the mechanism for actuating the sides and ends thereof, the said mechanism being shown in the locked position, the journal and the journal-box of the operating-screw being shown in section. Fig. 8 is a similar view showing the parts in the unlocked position. Fig. 9 is a section taken on the line 9 9, Fig. 2.

The same reference characters indicate the same parts in all the views.

Let A designate a base board or block upon which are mounted core-pieces A' for the purpose of forming a hollow block in the mold. Between these core-pieces is located a cross-piece $A^2$. Upon this base A is set the body of the mold proper, consisting of a bottom B, two side pieces C, and two end pieces C'. The ends of the side pieces are slotted, and the ends of the end pieces are provided with tongues or reduced parts adapted to enter the slots of the sides, whereby the sides and ends are united in suitable interlocking relation when the parts are assembled. Mounted on opposite sides of the bottom B of the mold are two uprights or standards B', whose upper extremities are provided with journal-boxes $B^2$, which receive the journals of short screw-shafts $B^3$, the threads of the screws engaging upper and lower nut parts $B^4$ for each screw. The nuts are divided for convenience in assembling the parts. By virtue of the fact that the screws are journaled the sides of the mold to which the nuts are applied may be caused to move inwardly and outwardly, according to the direction in which the screws are turned. The threads of the two screws are made right and left in order that the sides of the mold may be moved in opposite directions by the movement of their screws in the same direction. Eccentrically connected with the hub of each screw $B^3$, as shown at $B^5$, are two connecting-rods $B^6$, each of which is bifurcated, the arms of its bifurcation being connected with the ends of the mold at upper and lower points. The arms forming the fork or bifurcation of each rod $B^6$ are designated $B^7$, and their extremities are threaded and passed through openings formed in the end of the mold. To these threaded ends of the arms are applied nuts on opposite sides, the inner nuts forming stops and the outer nuts serving to fasten or secure the ends to the arms of the rods. The inner extremity of each rod $B^6$ is connected with the hub of the screw at a suitable distance from the axis of the screw. In this way as the screw is turned the rods are given an eccentric or crank action.

When the screws are in the locked position, whereby the two sides are made to approach nearest each other, the inner extremities of the rods are made to engage the journal-bearings $B^2$ on the outside, and to this end the rods are curved, as shown at $B^8$, to conform to the shape of the bearing, whereby when the screws are actuated to cause the rods to move the ends of the mold to the closed position the pivoted extremities $B^5$ of the rods are thrown above and below the center or axis of the screw, the extremities of the rods occupying what may be termed a "dead-center" position, whereby there is no tendency of the ends of the mold to spread apart under pressure, since the pull or force applied to the ends will be above and below the axis of the screw respectively, thus making it impossible to move the ends outwardly by an outward thrust or pressure from the inside.

The parts $C'$ of the ends of the mold are preferably grooved, as indicated by dotted lines in Fig. 2, to receive the adjacent portions of the ends of the sides of the mold, thus locking the ends of the sides against outward movement at points remote from the action of the screws which are centrally located with reference to the sides of the mold. To the outer extremity of each journal which protrudes beyond its box $B^2$ sufficiently for the purpose is attached a hand crank or lever D of sufficient length to give the operator the necessary power to enable him to easily and quickly open and close the mold.

From the foregoing description the use and operation of my improved mold will be readily understood. Assuming that the mold is closed and in the position shown in Fig. 1, the concrete, mortar, or cement of which the block is to be formed is placed in the mold and tamped around the cores $A'$ until the mold is full. A suitable straight-edge is then moved over the top of the mold and in engagement therewith whereby its top is made perfectly level. A board or plate E (see Fig. 5) may then be placed upon the top of the mold, after which the latter is lifted from the base A and inverted, whereby it is made to occupy the position shown in Fig. 5. By the operation of the hand-levers D, whereby they are thrown from the position shown in Figs. 1 and 2 to the position shown in Fig. 4, the sides and ends of the mold are simultaneously moved away from the block, whereby the latter is released and left lying upon the board E. The mold is then removed from the board E and the block left lying there until it becomes sufficiently dried for purposes of removal. The mold is then returned to its normal position, and the levers are thrown from the position shown in Fig. 4 back to the position shown in Figs. 1 and 2, after which it is ready for another charge of cement, concrete, or mortar, as may be desired.

Since the ends of the sides of the mold engage shallow grooves formed in the ends of the mold, as indicated by dotted lines in Fig. 2 and as shown in detail in Fig. 9, the operating mechanism is so constructed and arranged that the ends of the mold are thrust outwardly sufficiently to relieve the ends of the sides from the said grooves before the outward movement of the sides begins, and when making the reverse movement the sides are returned to their closed position before the ends in order that the ends of the sides may be made to reëngage the grooves of the latter when the mold is closed.

Having thus described my invention, what I claim is—

1. In a mold of the class described, the combination of a support, coöperating sides and ends mounted thereon, and means suitably mounted and connected with the sides and ends of the mold and adapted when actuated to move the sides and ends simultaneously outwardly or inwardly as may be desired, comprising coöperating screws and nuts for operating the sides and rods connected with the screws for operating the ends.

2. The combination of a relatively stationary bottom, interlocking sides and ends movably mounted on the bottom, screws journaled in bearings mounted on the bottom on opposite sides of the mold, nuts mounted on the sides of the molds and engaging the threads of the screws, and rods connected with the screws outside of their centers and engaging the ends of the mold, the construction and arrangement of the parts being such that as the screws are actuated the sides and ends of the mold are simultaneously moved outwardly or inwardly as may be desired.

3. The combination of a relatively stationary bottom provided with standards, screws journaled in the standards, coöperating sides and ends mounted on the bottom, the sides having nuts which the screws are adapted to engage, and rods connected with the opposite ends of the mold at one extremity and with the screws at the opposite extremity outside of the centers of the screws, whereby as the latter are actuated, the sides and ends are simultaneously moved outwardly or inwardly as may be desired, the sides having their ends slotted and the ends having tongues engaging the slots, the said tongues projecting far enough beyond the sides to permit the necessary travel of the latter.

4. The combination with a bottom, of sides and ends movably mounted on the bottom, the ends of the sides being cut out to receive tongues or parts formed on the ends, the interlocking sides and ends forming mutual guides, bearings mounted on the bottom on opposite sides of the mold, screws journaled in the bearings, nuts mounted on the sides of the mold and engaged by said screws whereby as the screws are rotated, the sides are made to travel outwardly, and means for connecting the screws with the ends of the mold whereby the latter are moved outwardly and inwardly simultaneously with the corresponding travel of the sides.

5. In a mold, the combination of a bottom having a core-opening, a base-plate upon which the bottom rests, said plate having cores projecting upwardly into the mold, coöperating sides and ends movably mounted on the bottom, and means mounted on the bottom and connected with the sides and ends for simultaneously actuating the latter, said means comprising screws engaging nuts formed on the sides and rods connecting the screws with the ends, substantially as described.

6. The combination of a relatively stationary bottom, interlocking sides and ends movably mounted thereon, standards mounted on the bottom on opposite sides of the mold, screws journaled in the said standards and engaging nuts with which the sides are provided, rods connecting the ends with the screws, the inner extremities of the rods being bent to conform to the curve of the journal-bearings, the connection and arrangement being such that when the mold is closed the extremities of the rods on each side of the mold, are carried respectively above and below the center of the screws, substantially as described and for the purpse set forth.

7. In a mold, the combination of a support, coöperating sides and ends mounted thereon, the ends being vertically grooved on their inner surface to receive the ends of the sides in interlocking engagement, and means suitably supported, connected with the sides and ends of the mold and adapted when actuated to move the sides and ends outwardly or inwardly when desired, said means comprising screws, nuts engaged thereby and rods connecting the ends with the screws.

In testimony whereof I affix my signature in presence of two witnesses.

THOMAS A. McMURTRIE.

Witnesses:
A. J. O'BRIEN,
ALVIN C. HAFFNER.